Patented Feb. 7, 1933

1,896,544

UNITED STATES PATENT OFFICE

JOSEPH R. INGRAM, OF NITRO, WEST VIRGINIA, ASSIGNOR TO THE RUBBER SERVICE LABORATORIES COMPANY, OF AKRON, OHIO, A CORPORATION OF OHIO

ANTIOXIDANT FOR VULCANIZED RUBBER PRODUCTS

No Drawing.   Application filed February 18, 1931.   Serial No. 516,835.

The present invention relates to a process for the manufacture of vulcanized rubber and the products obtained thereby. More particularly, the invention is directed to the use in a rubber mix of an anti-oxidant or compound which imparts age resisting properties to the vulcanized rubber product.

It is well known that rubber deteriorates rapidly when exposed to air, heat and sunlight, and that such deterioration is characterized by a loss in the tensile strength, resiliency and other desirable properties of the material. It has been found according to the present invention that such deterioration can be very greatly lessened if there be incorporated in the rubber mix a compound of the class hereinafter set forth.

The age resisting characteristics of a vulcanized rubber product can be readily ascertained by subjecting the vulcanized product to an accelerated aging test wherein portions of the cured rubber product are subjected in a bomb to the action of oxygen under pressure and maintained for several hours at an elevated temperature. The treated samples are then examined and tested and the results so obtained compared with similar results obtained by testing the unaged vulcanized stock. The deterioration in properties suffered as a result of from 18 to 39 hours of the oxidation treatment at a pressure of 300 pounds of oxygen is indicative of the result that would normally be expected from that particular stock during approximately two to three years of natural aging. Such a test is known as the Bierer-Davis aging test.

The new class of anti-oxidant or age resisting materials which have been found upon incorporation into a rubber stock to impart such excellent age resisting qualities to the vulcanized product that portions thereof, when subjected to the artificial aging tests described, undergo only a relatively small loss in tensile strength and other qualities, is obtained by reacting an aromatic secondary amine and a sulfur chloride in such a manner that in the product formed the nitrogen atoms of said amine are joined directly to a sulfur atom.

One method whereby one of the preferred class of anti-oxidants, for example, a reaction product of diphenylamine and sulfur dichloride, wherein the nitrogen atom of said diphenylamine is joined directly to a sulfur atom, was prepared follows:

Substantially one molecular proportion of sulfur dichloride, preferably suspended in a suitable reaction medium, as for example carbon tetrachloride, was slowly added to substantially two molecular proportions of diphenylamine, preferably in the presence of a further quantity of the reaction medium used, as for example carbon tetrachloride, while agitating and maintaining the resulting mixture at approximately 10 to 12° C. The agitation was then continued for approximately two hours longer at a temperature of approximately 10° C. The reaction medium employed, for example, carbon tetrachloride, and any unreacted sulfur dichloride were then removed by any convenient means, as for example by distillation, and the residue digested with a suitable solvent, for example ethyl alcohol, to remove any unreacted diphenylamine. It is thought that the reaction representing the preparation of the above compound proceeds as follows:

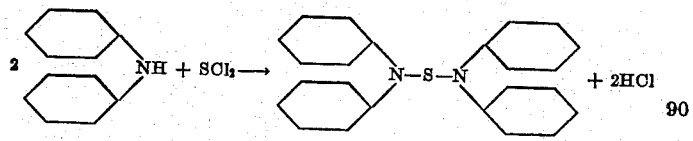

The material prepared as described was compounded in the well known manner in a rubber stock comprising 100 parts of smoked sheet rubber, 40 parts of carbon black, 10 parts of zinc oxide, 2 parts of a blended mineral oil and rosin, 3.25 parts of sulfur, 1 part of diphenylguanidine, and 1 part of the reaction product of diphenylamine and sulfur dichloride prepared in the manner above described.

The stock thus formed was then vulcanized by heating sheets of the said stock in a press in the well known manner for different periods of time at the temperature given by 40 pounds of steam pressure per square inch. Portions of the stock cured in the manner as described were then artificially aged by heating in an oxygen bomb in the manner described for 39 hours at a temperature of 70° C. and under an oxygen pressure of 300 pounds per square inch. A comparison between the tensile and modulus properties of the aged and unaged vulcanized rubber product so obtained is given in Table I.

Table I

| Cure mins. | Hours aged | Modulus of elasticity in lbs/in² at elongations of | | Tensile at break in lbs/in² | Ultimate elongation % |
|---|---|---|---|---|---|
| | | 300% | 500% | | |
| 30 | 0 | 733 | 1840 | 2500 | 605 |
| 30 | 39 | 818 | | 1625 | 480 |
| 60 | 0 | 1205 | 2790 | 3925 | 630 |
| 60 | 39 | 1210 | 2310 | 2475 | 530 |
| 90 | 0 | 1555 | 3370 | 4210 | 600 |
| 90 | 39 | 1495 | | 2355 | 450 |

The data set forth in Table I show that the preferred class of anti-oxidant materials, for example, the reaction product of diphenylamine and sulfur dichloride prepared in the manner described, possess particularly desirable anti-oxidant properties.

Another example of the preferred class of anti-oxidants was prepared by reacting substantially two molecular proportions of phenyl-beta-naphthylamine with substantially one molecular proportion of sulfur dichloride in a manner analogous to that described above, except that the addition of the reactants was carried out at approximately 15° C., and after the addition was completed, the resulting mixture was maintained at a temperature of approximately 60° C. for approximately one hour. It is thought that the reaction representing the preparation of the compound described proceeds according to the following equation:

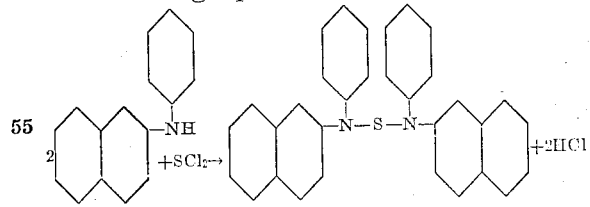

The product thus prepared was compounded in a rubber stock comprising 100 parts of smoked sheet rubber, 40 parts of carbon black, 10 parts of zinc oxide, 2 parts of a blended mineral oil and rosin, 3.25 parts of sulfur, 1 part of diphenylguanidine, and 1 part of the reaction product of phenyl-beta-naphthylamine and sulfur dichloride prepared in the manner above described.

The stock was then vulcanized by heating for different periods of time at the temperature given by 40 pounds of steam pressure per square inch. Portions of the stock thus cured were then artificially aged by heating in an oxygen bomb in the manner hereinbefore described for 39 hours at a temperature of 70° C. and under an oxygen pressure of 300 pounds per square inch. A comparison between the tensile and modulus properties of the aged and unaged vulcanized rubber product is given in Table II.

Table II

| Cure mins. | Hours aged | Modulus of elasticity in lbs/in² at elongations of | | Tensile at break in lbs/in² | Ultimate elongation % |
|---|---|---|---|---|---|
| | | 300% | 500% | | |
| 30 | 0 | 873 | 2260 | 3090 | 610 |
| 30 | 39 | 821 | 1845 | 2080 | 530 |
| 60 | 0 | 1400 | 3150 | 4045 | 610 |
| 60 | 39 | 1285 | 2465 | 2680 | 540 |
| 90 | 0 | 1650 | 3555 | 4215 | 580 |
| 90 | 39 | 1525 | | 2680 | 485 |

From the data set forth in Table II it is apparent that the reaction product of phenyl-beta-naphthylamine and sulfur dichloride prepared in the manner described possesses the desirable anti-oxidant properties of the preferred class of compounds.

As a further example of operating the present invention, a compound was prepared by reacting substantially two molecular proportions of phenyl-beta-naphthylamine with substantially one molecular proportion of sulfur monochloride in a manner similar to that hereinbefore described. This product, when compounded in a rubber mix and tested as in the manner hereinbefore set forth, showed the desirable anti-oxidant qualities of the preferred class of materials.

As a further example of a reaction product of an aromatic amine and a sulfur chloride, a product was prepared by reacting substantially two molecular proportions of the aniline derivative of dioxydinaphthyl sulfide, prepared according to the method given in U. S. Patent application, Serial No. 461,850, with substantially one molecular proportion of sulfur dichloride. This product was incorporated in a rubber stock which comprised 100 parts of smoked sheet rubber, 40 parts of carbon black, 10 parts of zinc oxide, 2 parts of a blended mineral oil and rosin, 3.25 parts of sulfur, 1 part of diphenylguanidine, and 1 part of the reaction product of sulfur dichloride and the aniline derivative of dioxydinaphthyl sulfide, and was cured for one hour in a manner similar to that hereinbefore described, and a portion of the resulting product was tested and found to possess a tensile strength of 4200 pounds per square inch. Another portion of the cured product was artificially aged for 39 hours in the manner hereinbefore described and the resulting aged product was then tested and found to possess a tensile strength of 2335 pounds per square inch These results show that the compound described possesses very desirable anti-oxidant properties.

Other aromatic amines, as for example aldol-alpha-naphthylamine, 1, 2, 4-tolylene-diamine, alpha-naphthylamine, beta-naphthylamine, and aniline, have been reacted with sulfur monochloride, and the products formed have been employed as anti-oxidants.

In like manner, other reaction products of an aromatic secondary amine and a sulfur chloride may be formed as further examples of the preferred class of anti-oxidants. For example, ditolylamine, phenyl-alpha-naphthylamine, beta-beta-dinaphthylamine, and the like, may be reacted with sulfur monochloride or sulfur dichloride and the like to produce products of the type claimed herein, and the products formed may be employed as anti-oxidants in a rubber stock of vulcanization characteristics.

In the examples hereinbefore set forth, diphenylguanidine was employed as the accelerator because it is known that a stock wherein it is employed possesses poor aging qualities. Other accelerators could, of course, have been employed in the tests hereinbefore described, resulting in different tensile and modulus figures than those hereinbefore set forth but still exhibiting the desirable anti-oxidant properties of the preferred class of compounds.

From the data hereinbefore set forth it is shown that the reaction products of an aromatic secondary amine and a sulfur chloride possessing the structure described, comprise an important class of anti-oxidants which have been employed advantageously in a rubber stock.

The present invention is limited solely by the claims attached hereto as a part of the present specification wherein it is intended to claim the invention as broadly as possible in view of the prior art.

What is claimed is:

1. The process of vulcanizing rubber which comprises heating rubber and sulfur in the presence of an anti-oxidant comprising a reaction product of an aromatic secondary amine and a sulfur chloride, wherein the nitrogen atom of said amine is joined directly to a sulfur atom.

2. The process of vulcanizing rubber which comprises heating rubber and sulfur in the presence of an anti-oxidant comprising a compound possessing the structure

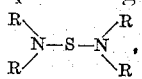

wherein R represents an aromatic radical.

3. The process of vulcanizing rubber which comprises heating rubber and sulfur in the presence of an anti-oxidant comprising a reaction product of an aromatic secondary amine and sulfur dichloride, wherein the nitrogen atom of said amine is joined directly to a sulfur atom.

4. The process of vulcanizing rubber which comprises heating rubber and sulfur in the presence of an anti-oxidant comprising a reaction product of phenyl-beta-naphthylamine and a sulfur chloride, wherein the nitrogen atom of said phenyl-beta-naphthylamine is joined directly to a sulfur atom.

5. The process of vulcanizing rubber which comprises heating rubber and sulfur in the presence of an anti-oxidant comprising a compound possessing the structure

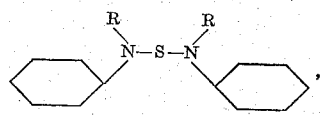

wherein R represents an aromatic radical.

6. The process of vulcanizing rubber which comprises heating rubber and sulfur in the presence of an anti-oxidant comprising a compound possessing the structure

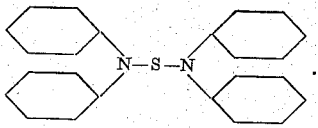

7. The process of vulcanizing rubber which comprises heating rubber and sulfur in the presence of an anti-oxidant comprising the reaction product of substantially two molecular proportions of phenyl-beta-naphthylamine and substantially one molecular proportion of sulfur dichloride, wherein the nitrogen atom of said phenyl-beta-naphthylamine is joined directly to the sulfur atom of said sulfur dichloride.

8. The vulcanized rubber product prepared by heating rubber and sulfur in the presence of an anti-oxidant comprising a reaction product of an aromatic secondary amine and a sulfur chloride, wherein the nitrogen atom of said amine is joined directly to a sulfur atom.

9. The vulcanized rubber product prepared by heating rubber and sulfur in the presence of an anti-oxidant comprising a compound possessing the structure

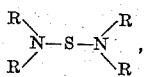

wherein R represents an aromatic radical.

10. The vulcanized rubber product prepared by heating rubber and sulfur in the presence of an anti-oxidant comprising a reaction product of an aromatic secondary amine and sulfur dichloride, wherein the nitrogen atom of said amine is joined directly to a sulfur atom.

11. The vulcanized rubber product prepared by heating rubber and sulfur in the presence of an anti-oxidant comprising a reaction product of phenyl-beta-naphthylamine and a sulfur chloride, wherein the nitrogen atom of said phenyl-beta-naphthylamine is joined directly to a sulfur atom.

12. The vulcanized rubber product prepared by heating rubber and sulfur in the presence of an anti-oxidant comprising a compound possessing the structure

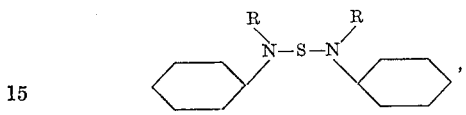

wherein R represents an aromatic radical.

13. The vulcanized rubber product prepared by heating rubber and sulfur in the presence of an anti-oxidant comprising a compound possessing the structure

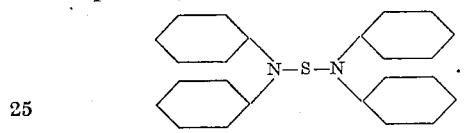

14. The vulcanized rubber product prepared by heating rubber and sulfur in the presence of an anti-oxidant comprising the reaction product of substantially two molecular proportions of phenyl-beta-naphthylamine and substantially one molecular proportion of sulfur dichloride, wherein the nitrogen atom of said phenyl-beta-naphthylamine is joined directly to the sulfur atom of said sulfur dichloride.

In testimony whereof I hereunto affix my signature.

JOSEPH R. INGRAM.